United States Patent Office 3,804,948
Patented Apr. 16, 1974

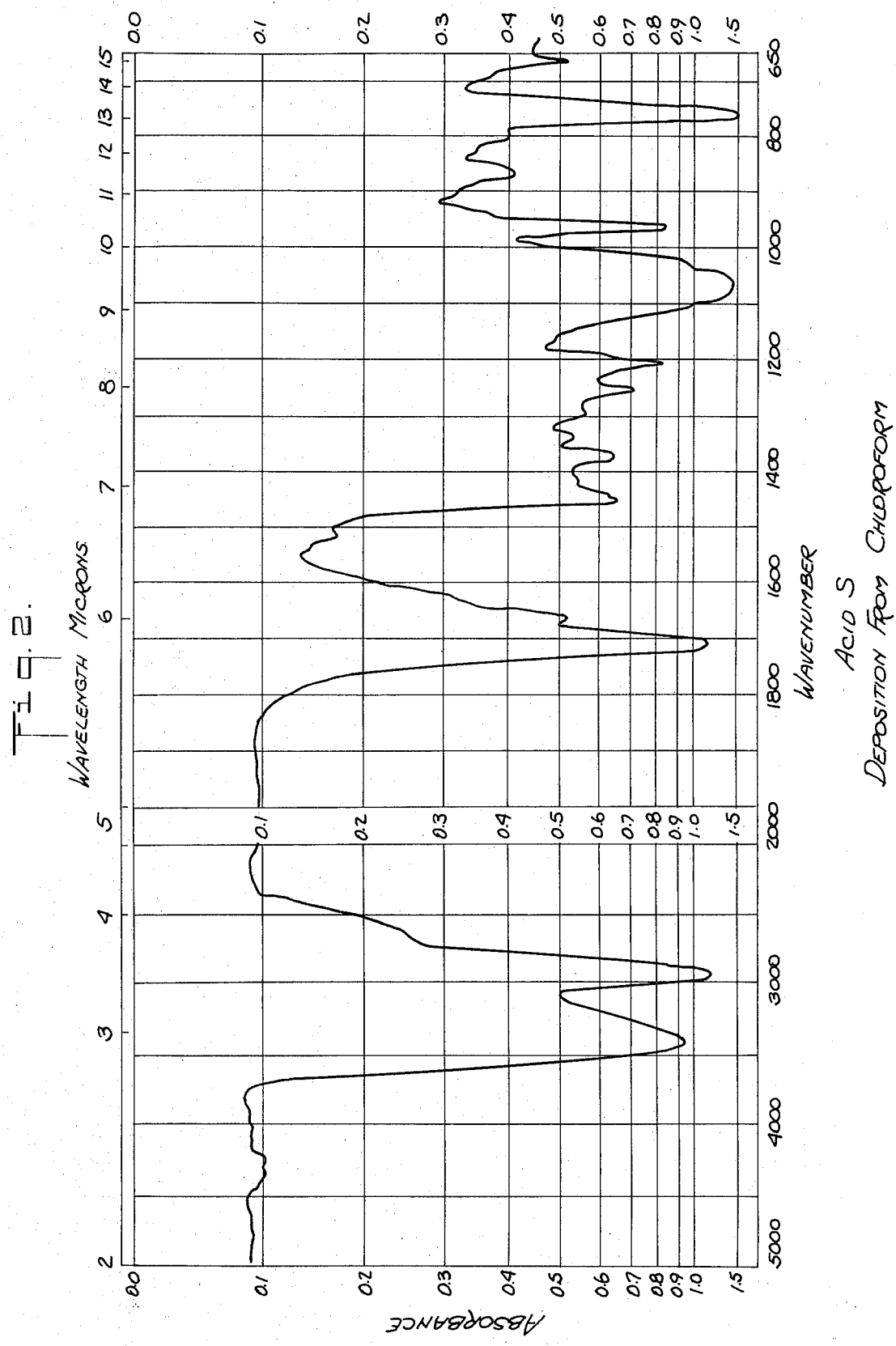

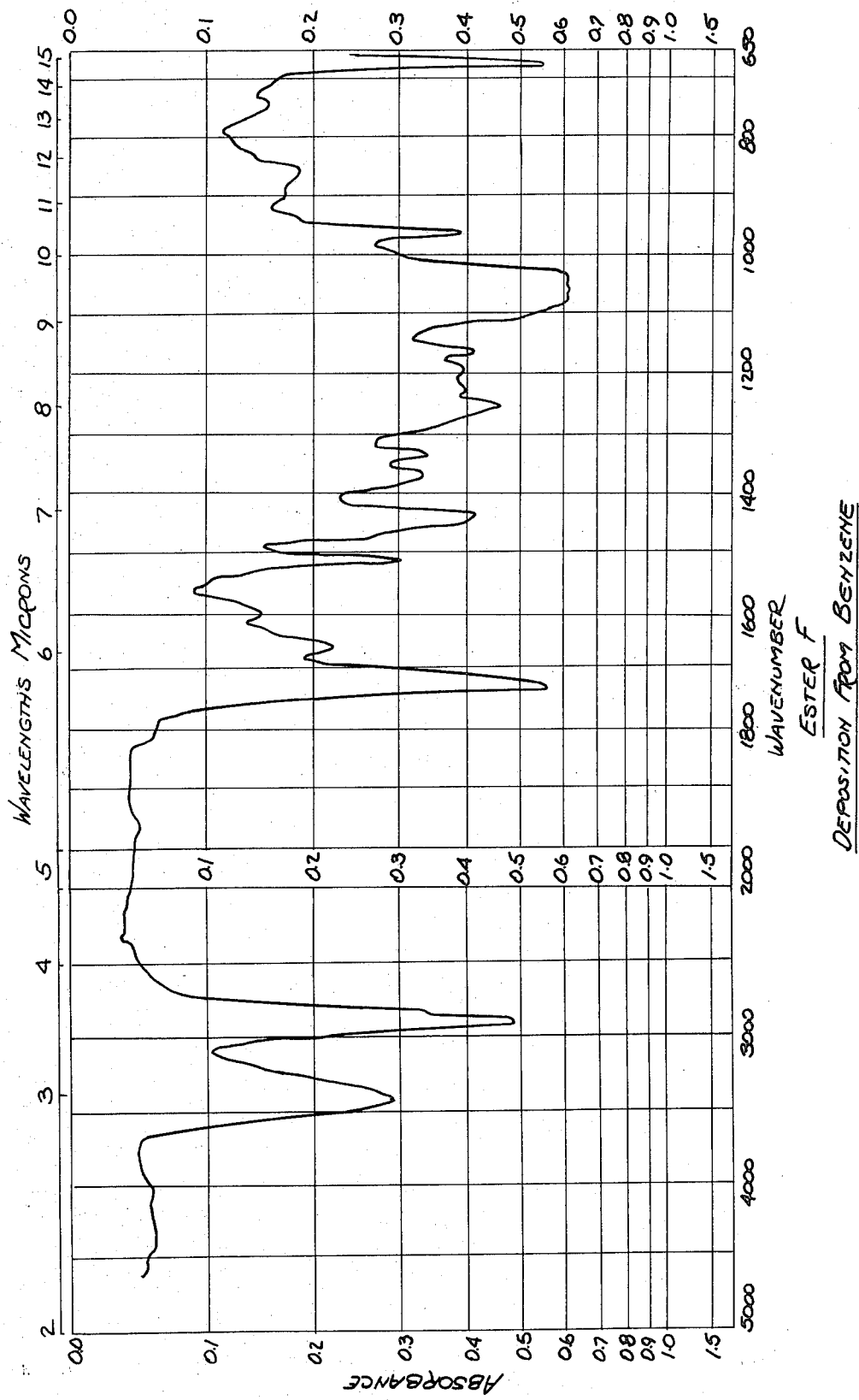

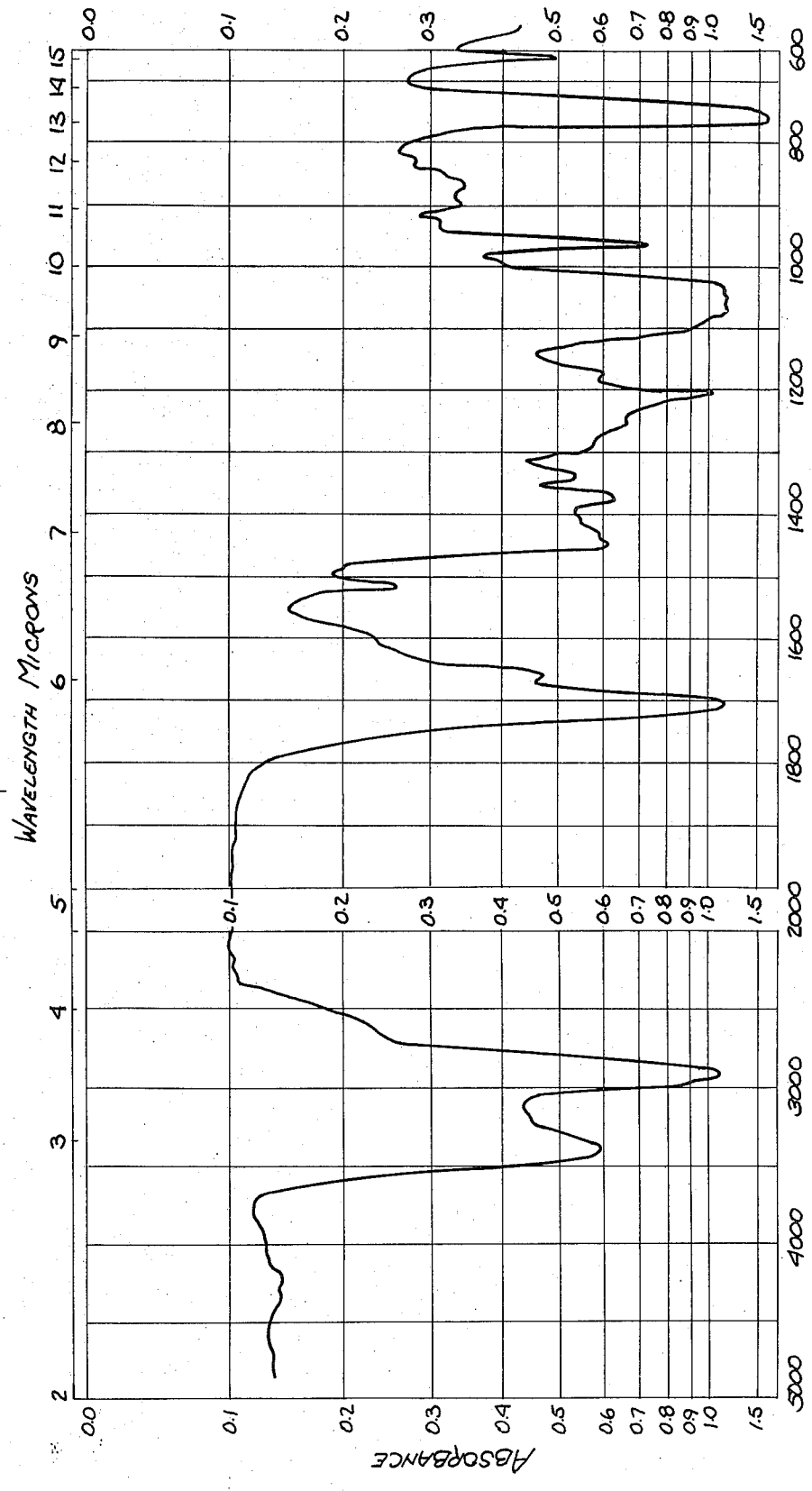
Fig. 4. Acid F Deposition From Chloroform

3,804,948
ANTIFUNGAL SUBSTANCES FROM POLY-
ANGIUM CELLULOSUM VAR. FULVUM
Max von Strandtmann, Rockaway Township, Samuel Ringel, Rockaway, and Ann Gutt, Passaic, N.J., assignors to Warner-Lambert Company, Morris Plains, N.Y.
Filed Feb. 15, 1972, Ser. No. 226,524
Int. Cl. A61k 21/00
U.S. Cl. 424—122                    4 Claims

ABSTRACT OF THE DISCLOSURE

The present invention discloses a process for the isolation and characterization of antifungal carboxylic acids produced by the microorganism Polyangium cellulosum var. fulvum (ATCC No. 25532).

Figure 1:
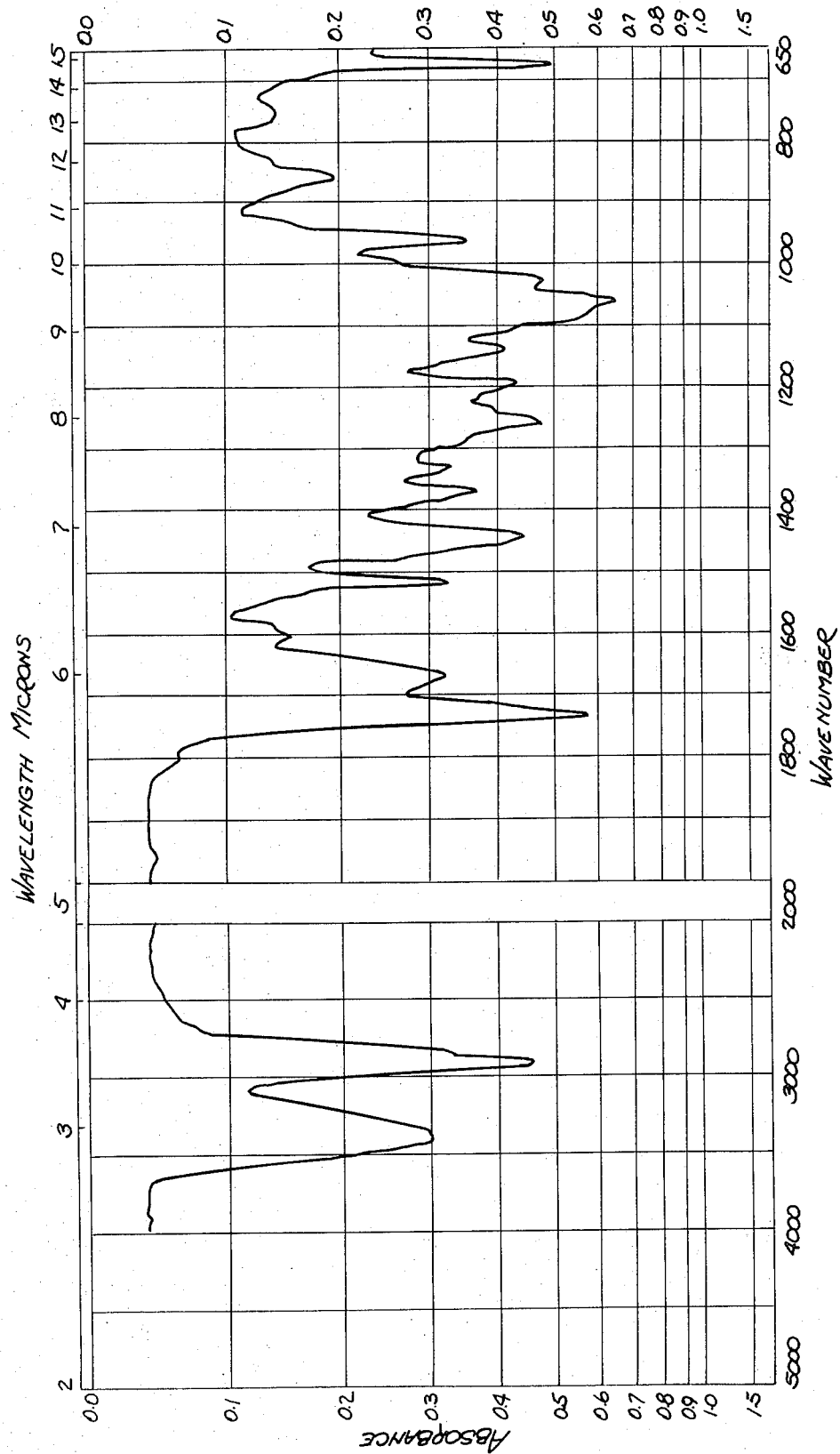

These acids, designated as F and S are effective against a variety of fungi.

---

The present invention relates to a process for the isolation and characterization of antifungal agents produced by the microorganism Polyangium cellulosum var. fulvum (ATCC No. 25532). The deposit of this organism is open to the public without restriction and it will be maintained throughout the life of this patent.

This invention also includes within its scope the antifungal substances thus obtained and their derivatives.

It has been disclosed in U.S. patent application No. 36,158, filed May 11, 1970 now U.S. Pat. 3,651,216 issued Mar. 21, 1971 that the aforesaid organism produces several antifungal substances when fermented in a suitable medium.

An object of this invention is to provide a novel process whereby several antifungal substances are separated.

A further object of this invention is to characterize the separated antifungal substances.

Yet another object of this invention is to provide a process for the production of novel derivatives of these antifungal substances.

Another object of this invention is to purify these antifungal substances so that they can be incorporated into suitable dosage forms.

Other objects and advantages of this invention will become apparent from the following description.

The conditions for the cultivation of this organism and the fermentation of the antibiotic substances have been disclosed in the copending U.S. patent application No. 36,158 filed May 11, 1970.

We have now found that the fermentation broth contains four chemically distinct antifungal components. These components are designated "Acid F," "Acid S," "Component B," and "Component C." The mixture of acids F and S is designated in the copending patent application No. 36,158 as "Component A."

Acids F and S are major components which contribute to 70–90% of activity, depending on fermentation conditions.

The present invention concerns acids F and S. Components B and C will be the subject of a separate patent application.

The practice of this invention is illustrated as follows:

The fermentation broth obtained by cultivating the above organism in accordance with the procedures set forth in the above application is filtered and extracted with a solvent such as ethyl acetate, chloroform, butanol, methylene chloride and the like. Generally speaking, a ratio of one part of solvent to five parts of broth is employed to extract the broth until substantially all the components F and S are removed. Typically, the acids F and S are removed after three separate extraction procedures.

The extract is concentrated under reduced pressure at a temperature not exceeding 45° C. to approximately 1% of its volume. The concentrate is allowed to stand at about 4° C. for 24 hours and is clarified by filtration.

The filtrate is evaporated to dryness, 2% acetic acid is added until acidic pH is reached, e.g., pH 3 to 4, and the mixture is extracted with chloroform. The extract is dried over $Na_2SO_4$ and concentrated to a low volume. The latter operation, although useful for the liberation of the acids from their salts is optional and not required for the next step.

The antibiotic concentrate is adsorbed on a Florisil column in a ratio of 1:10 to 1:20 (by weight). The column is developed with a nonpolar solvent such as ethyl acetate. This removes the majority of inactive materials. The active components which are firmly held by Florisil are recovered by eluting with a polar solvent such as methanol. The methanol eluates are evaporated to dryness to give the crude antibiotic mixture containing 20–30% of active matter.

Further purification is achieved by column chromatography on silica gel using a ratio of 1 g. of the above crude mixture to approximately 100 g. of silica gel. The column is developed with ethyl acetate:isopropanol:water systems in the ratio of 85:10:5. The eluates are monitored by thin-layer chromatography (Silica Gel, Quantum Industries) using the same system as used in the column. The Rf values are as follows: Acid F, Rf=0.68, and Acid S, Rf=0.56.

By employing the above procedure, acids F and S are separtaed from components B and C and other inactive matter.

Alternatively, the purification step involving column chromatography on florisol may be omitted. Instead, a higher ratio of silica gel to the crude ethyl acetate extract is used. For example, a ratio of 200 parts silica gel to one part ethyl acetate extract has been found to give satisfactory purification results.

The acids F and S thus obtained have the following physical characteristics:

Acid F: Empirical Formula $C_{28}H_{42}O_6$, MW 474, infrared spectrum ν 870, 965, 1063, 1255, 1388, 1453, 1663, 1710, 2950, and 3400 cm.$^{-1}$ approximate $[\alpha]^{25}_D$ +74°, (chloroform, C=0.8), Rf 0.68 [silica gel, ethyl acetate: isopropanol:water (85:10:5)].

Acid S: Empirical Formula $C_{28}H_{24}O_6$, MW 474, infrared spectrum ν 870, 965, 1063, 1255, 1388, 1453, 1663, 1710, 2950, and 3400 cm.$^{-1}$, approximate $[\alpha]_D^{25}$ +36°, (chloroform, C=0.7), Rf 0.56 [silica gel, ethyl acetate: isopropanol:water (85:15:5)].

The above acids F and S are converted to their respective esters. Typically, this conversion is effected by employing the following procedure:

The crude ethyl acetate extract, after partial purification on a Florisil column, is treated with an excess of ethanolic-ethereal diazomethane solution at room temperature for the period of 15 min. This accomplishes the conversion of acids F and S to their methyl esters. The esters are separated by chromatography on silica gel using ethyl acetate:cyclohexane (4:1) system as the mobile phase.

These esters of acids F and S have the following physical characteristics:

Ester F: Empirical Formula $C_{29}H_{44}O_6$, MW 488, infrared spectrum ν 860, 965, 1060, 1165, 1255, 1370, 1430, 1515, 1660, 1730, 2900, and 3350 cm.$^{-1}$, Rf 0.78 [silica gel, ethyl acetate:cyclohexane (4:1)].

Ester S: Empirical Formula $C_{29}H_{44}O_6$, MW 488, infrared spectrum ν 860, 965, 1060, 1200, 1250, 1370, 1440, 1518, 1658, 1725, 2900, and 3400 cm.$^{-1}$, Rf 0.56 [silica gel, ethyl acetate:cyclohexane (4:1)].

The acids F and S can be recovered from their esters in pure form by refluxing the esters for 1 hr. in 1 N NaOH.

These acids and esters exhibit the same antibiotic spectrum as that described in said copending application and are to be used in a similar manner for treating fungal infections; for example, 0.1% by weight of the acid or ester formulated with a dermatologically acceptable vehicle such as talc or petrolatum and applied topically to relieve a susceptible fungal infection.

We claim:

1. An antibiotic substance having the following characteristics:

Empirical Formula $C_{28}H_{42}O_6$, MW 474, infrared spectrum $\nu$ 870, 965, 1063, 1255, 1388, 1453, 1663, 1710, 2950, and 3400 cm.$^{-1}$, approximate $[\alpha]_D^{25}$ +74°, (chloroform, C=0.8), Rf 0.68 [silica gel, ethyl acetate:isopropanol:water (85:10:5)].

2. An antibiotic substance having the following characteristics:

Empirical Formula $C_{28}H_{42}O_6$, MW 474, infrared spectrum $\nu$ 870, 965, 1063, 1255, 1388, 1453, 1663, 1710, 2950, and 3400 cm.$^{-1}$, approximate $[\alpha]_D^{25}$ +36°, (chloroform, C=0.7), Rf 0.56 [silica gel, ethyl acetate:isopropanol:water (85:15:5)].

3. An antibiotic substance having the following characteristics:

Empirical Formula $C_{29}H_{44}O_6$, MW 488, infrared spectrum $\nu$ 860, 965, 1060, 1165, 1255, 1370, 1430, 1515, 1660, 1730, 2900, and 3350 cm.$^{-1}$, Rf 0.78 [silica gel, ethyl acetate:cyclohexane (4:1)].

4. An antibiotic substance having the following characteristics:

Empirical Formula $C_{29}H_{44}O_6$, MW 488, infrared spectrum $\nu$ 860, 965, 1060, 1200, 1250, 1370, 1440, 1518, 1658, 1725, 2900, and 3400 cm.$^{-1}$, Rf 0.56 [silica gel, ethyl acetate:cyclohexane (4:1)].

References Cited
UNITED STATES PATENTS 3,651,216   3/1972   Ringel et al. _____ 424—115

JEROME V. GOLDBERG, Primary Examiner